United States Patent Office 3,684,646

Patented Aug. 15, 1972

1

3,684,646

LAMINAR STRUCTURES OF POLYIMIDES

John Anthony Kreuz, Williamsville, Don Albert Roper, Buffalo, N.Y.; said Kreuz assignor to E. I. du Pont de Nemours and Company, Wilmington, Del.

No Drawing. Filed Nov. 12, 1969, Ser. No. 876,098
Int. Cl. B32b 27/28; H01b 3/30; C08g 20/32
(Filed under Rule 47(a) and 35 U.S.C. 116)
U.S. Cl. 161—165 6 Claims

ABSTRACT OF THE DISCLOSURE

A laminar article is provided of a layer of a polyimide and a layer of a fluorinated polymer, which structure is suitable in the form of narrow tapes for electrical insulation uses.

THE INVENTION

The present invention relates to laminar structures. More particularly, the present invention is directed to improvements in and relating to laminar articles of polyimides and fluorinated polymeric materials.

Laminar articles of polyimide polymeric materials and fluorocarbon polymers are known articles of manufacture desirable for many diverse uses because characterized by a unique combination of physical properties not separately possessed by each individual constituent material thereof. The main drawback of such laminar structures resides in the lack of sufficient bond strength and durability when exposed to environments of high moisture content. For instance, U.S. Pat. No. 3,179,634 describes laminar structure of polyimide and fluoropolymer wherein the composite is formed by treating the surface of a self-supporting film of a tetrafluoroethylene/hexafluoropropylene copolymer with an electrical discharge to improve surface adherability, coating the treated film by solvent-casting thereon a polyamide-acid precursor of the desired polyimide, and then converting the polyamide-acid layer to polyimide by treatment with acetic anhydride and pyridine, followed by solvent removal in a vacuum oven at 100° C. A major drawback of such structures resides in the lack of adequate bond strength when exposed to moisture. In addition to the foregoing, U.S. Pat. No. 3,297,476 discloses a laminar structure of polyimides and fluorinated polymeric material obtained by priming the surface of the polyimide component with a polyethylenimine surface priming agent before combining the polyimide with the fluorinated polymeric material whereby hopefully to improve the bond strength between these layers of the laminar structure. It is the principal object of the present invention to provide a novel laminar structure of polyimide and fluorocarbon polymeric materials characterized by improved bond strength especially when exposed to elevated temperatures or to water or high moisture containing environments without requiring specially treatments of the components thereof.

According to the present invention there is provided a laminar structure comprising at least three layers including a base layer of a non-heat-sealable polyimide, a layer of a heat-sealable polyimide and a layer of a fluorocarbon polymeric material characterized by improved bond strength and durability when exposed to environments of high moisture content. The laminar structure

2 preferably comprises a base layer of a non-heat-sealable polyimide, a layer of a heat-sealable polyimide and a layer of a copolymer of between about 5% and about 50% by weight, based upon the total copolymer weight, of hexafluoropropylene and between about 50% and about 95% by weight, based upon the total copolymer weight, of tetrafluoroethylene.

The laminar structure of the invention is characterized by a base layer of a non-heat-sealable polyimide of the following recurring structural unit:

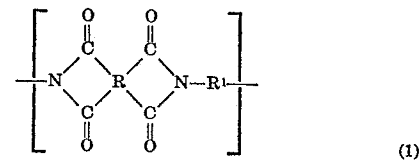

(1)

where R is a tetravalent aromatic organic radical including the following and substituted derivatives thereof:

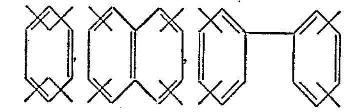

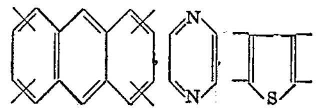

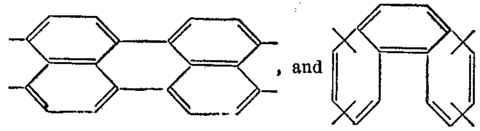

the said R being such as obtained from a dianhydride of the formula

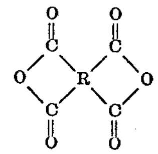

where R has the same meaning as above; and where $R^1$ is a divalent aromatic radical (arylene), preferably one of the following groups: phenylene, naphthylene, biphenylene, anthrylene, furylene, benzfurylene, and

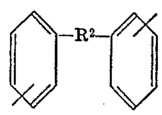

wherein $R^2$ is selected from alkylene of 1–3 carbon atoms, oxygen, sulfur, or one of the following:

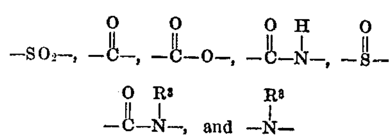

wherein $R^3$ is methyl or phenyl. The $R^1$ groups are conveniently derived from organic diamines having the formula $H_2N—R^1—NH_2$ where $R^1$ is as above defined. In such R radicals indicated hereinabove having free valencies shown in indefinite positions, the free valencies are so disposed that there are two pairs of valencies, each pair being either ortho or peri.

Suitable non-heat-sealable polyimides for the laminar structure of the present invention include such as are derived from the following dianhydrides:

pyromellitic dianhydride;
3,4,9,10-perylenetetracarboxylic dianhydride;
naphthalene-2,3,6,7-tetracarboxylic dianhydride;
naphthalene-1,4,5,8-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
pyrazine-2,3,5,6-tetracarboxylic dianhydride;
benzene-1,2,3,4-tetracarboxylic dianhydride;
thiophene-2,3,4,5-tetracarboxylic dianhydride; etc.

Suitable non-heat-sealable polyimides for the laminar structure of the present invention also include such as are derived from the following diamines:

meta-phenylenediamine;
para-phenylenediamine;
2,2-bis(4-aminophenyl)propane;
4,4'-diaminodiphenylmethane;
4,4'-diaminodiphenyl sulfide;
4,4'-diaminodiphenyl sulfone;
3,3'-diaminodiphenyl sulfone;
4,4'-diaminodiphenyl ether;
2,6-diaminopyridine;
benzidine;
3,3'-dichlorobenzidine;
3,3'-dimethoxybenzidine;
4,4'-diaminobenzophenone;
N,N-bis(4-aminophenyl)methylamine;
1,5-diaminonaphthalene;
3,3'-dimethyl-4,4'-diaminobiphenyl;
m-aminobenzoyl-p-aminoanilide;
4-aminophenyl-3-aminobenzoate;
N,N-bis(4-aminophenyl)aniline;
position isomers of the above, etc., and mixtures thereof.

The polyimides and polyamide-acids are more fully described in patents such as U.S. 3,179,614 and U.S. 3,179,634. The thickness of the non-heat-sealable polyimide layer is between about 0.25 mil and about 5 mils, preferably between 0.5 and 2.0 mils.

The laminar structure of the invention is further characterized by a heat-sealable polyimide layer of a much smaller class of polyimides than the non-heat-sealable layer, characterized by a recurring unit having the following structural formula:

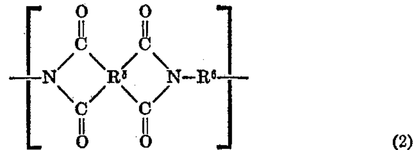

(2)

where $R^5$ is $$>Ar—R^7—Ar^1<$$

where Ar is phenylene, $Ar^1$ is phenylene, biphenylene or naphthylene, and $R^7$ is —O—, —S—,

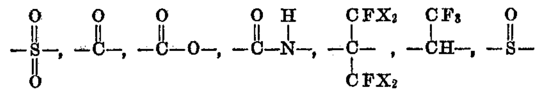

or alkylene of 1 through 3 carbons, where each X is separately chosen from the group consisting of F and Cl; and $R^6$ is alkylene of 7 through 10 carbons, meta-phenylene, or the following:

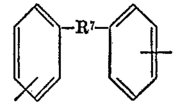

where $R^7$ has the same meaning as above.

In the recurring unit shown by Formula 2 each carbonyl group is attached to a separate carbon atom of the aromatic radicals of $R^5$, the carbonyl groups on each ring being ortho to each other.

The preferred heat-sealable polyimide is that wherein $R^5$ is

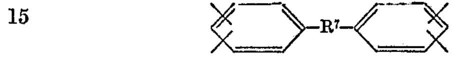

and $R^7$ is

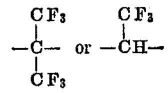

Suitable heat-sealable polyimides for the laminar structure of the present invention include such as are derived from the following dianhydrides:

2,3,2',3'-benzophenonetetracarboxylic dianhydride;
3,4,3',4'-benzophenonetetracarboxylic dianhydride;
6-(3',4'-dicarboxybenzoyl)-2,3-naphthalene dicarboxylic dianhydride;
4'-(3'',4''-dicarboxybenzoyl)-3,4-diphenyl dicarboxylic dianhydride;
4-(3',4'-dicarboxybenzoyloxy)phthalic dianhydride;
4-(3',4'-dicarboxybenzamido)phthalic dianhydride;
bis(3,4-dicarboxyphenyl) ether dianhydride;
bis(3,4-dicarboxyphenyl) sulfide dianhydride;
bis(3,4-dicarboxyphenyl) sulfone dianhydride;
bis(2,3-dicarboxyphenyl) methane dianhydride;
bis(3,4-dicarboxyphenyl) methane dianhydride;
1,1-bis(2,3 dicarboxyphenyl) ethane dianhydride;
1,1-bis(3,4-dicarboxyphenyl) ethane dianhydride;
2,2-bis(2,3-dicarboxyphenyl) propane dianhydride;
2,2-bis(3,4-dicarboxyphenyl) propane dianhydride;
2,2-bis(3,4-dicarboxyphenyl)-1,1,1-trifluoroethane dianhydride;
2,2-bis(3,4-dicarboxyphenyl) hexafluoropropane dianhydride;
2,2-bis(3,4-dicarboxyphenyl)-1-chloro-1,1,3,3,3-pentafluoropropane dianhydride;
2,2-bis(3,4-dicarboxyphenyl)-1,3-dichloro-1,1,3,3-tetrafluoropropane dianhydride;
2,2-bis(3,4-dicarboxyphenyl)-1,1,3,3-tetrachloro-1,3-difluoropropane dianhydride;
and position isomers of the above.

Suitable heat-sealable polyimides for the laminar structure of the present invention include such as are derived from the following diamines:

heptamethylenediamine;
3,3-dimethylpentamethylenediamine;
3-methylhexamethylenediamine;
3-methylheptamethylenediamine;
2,5-dimethylhexamethylenediamine;
octamethylenediamine;
nonamethylenediamine;
1,1,6,6-tetramehtylhexamethylenediamine;
2,2,5,5-tetramethylhexamethylenediamine;
4,4-dimethylheptamethylenediamine;
decamethylenediamine;
meta-phenylenediamine;
4,4'-diaminobenzophenone;
4-aminophenyl-3-aminobenzoate;
m-aminobenzoyl-p-aminoanilide;
bis(4-aminophenyl) ether;
bis(4-aminophenyl) methane;
1,1-bis(4-aminophenyl) ethane;

2,2-bis(4-aminophenyl) propane;
4,4'-diaminodiphenyl sulfoxide;
3,3'-diaminobenzophenone;
2,2'-diaminobenzophenone;
2,2-bis(4-aminophenyl)hexafluoropropane;
2,2-bis(4-aminophenyl)-1,3-dichloro-1,1,3,3-terafluoropropane.

The thickness of the heat-sealable polyimide layer is between about 0.01 mil and about 2.0 mils.

The laminar structure of the invention is further characterized by a layer of a fluorocarbon polymeric material. The expressions "fluorocarbon polymer" and "fluorocarbon polymeric material" as used herein mean copolymers of tetrafluoroethylene and hexafluoropropylene (FEP). The fluorocarbon polymers are extensively described in such patents as, for example, U.S. 2,833,686. The layer of fluorocarbon polymer is preferably a copolymer of between about 50% and about 95% tetrafluoroethylene and between about 5% and about 50% of hexafluoropropylene, especially wherein the amount of hexafluoropropylene is between about 7% and about 27%. Optionally, the fluorocarbon polymer layer may be blended with up to 95% by weight (of the total weight of the two polymers) of a homopolymer of tetrafluoroethylene. The thickness of the fluorocarbon polymer layer is preferably between about 0.05 mil and about 1 mil.

Several laminar structures of different construction can be made with the component materials in accordance with the present invention. For example, such structure comprises one layer of each component wherein the non-heat-sealable polyimide layer is in contact with the heat-sealable polyimide, and the latter is in contact with the fluorocarbon polymer layer whereby to provide a three layer laminar structure. Another structure comprises a layer of non-heat-sealable polyimide covered on both sides with the heat-sealable polyimide layer and wherein one surface of the latter is covered with a layer of the fluorocarbon polymer.

Yet another structure comprises a layer of non-heat-sealable polyimide covered on both sides with a layer of heat-sealable polyimide, and both layers of the latter are covered by a layer of the fluorocarbon polymer.

Various alternative processes are available for making the novel laminar structures of the present invention.

One method of fabricating the laminar structures of the present invention is to coat a preformed film of the non-heat-sealable polyimide with a coating lacquer of a suitable precursor which will cure to the heat-sealable polyimide layer. Suitable precursors include solutions in appropriate solvents of polyamide-acids (such as described in U.S. 3,179,614), polyamide esters (such as described in U.S. 3,312,663), mixtures of tetracarboxylic diacid diesters and diamines (such as described in U.S. 3,347,808), and other precursors known in the art. Application of the precursor is followed by heating to dry and cure it.

One method for bonding the heat-sealable polyimide layer to the fluorocarbon polymer is to laminate the composite structure of non-heat-sealable polyimide and heat-sealable polyimide with a self-supporting film of a tetrafluoroethylene/hexafluoropropylene copolymer (as defined above) under the action of heat and pressure. The surface of the fluorocarbon polymer film which is to be bonded to the heat-sealable polyimide layer must first be treated in an electrical discharge in the presence of an organic vapor such as glycidyl methacrylate, as described by McBride and Wolinski in U.S. Pat. 3,296,011. The lamination under heat and pressure may be done essentially as described in pending application Ser. No. 725,542, filed Apr. 30, 1968.

Alternately, the fluoropolymer layer may conveniently be applied to the composite of heat-sealable and non-heat-sealable polyimide layers as an aqueous polymer dispersion. More specifically, the fluoropolymer can be applied to the composite layers as a layer about 0.02 to 1.0 mil and preferably 0.04 to 0.3 mil thick of an aqueous dispersion of a colloidal copolymer of hexafluoropropylene and tetrafluoroethylene, said copolymer having a hexafluoropropylene content of 5 to 50 weight percent, and preferably 7 to 27 weight percent, and a specific melt viscosity of 1,500 to 300,000 poises, said dispersion having a solids content in the range of about 5% to 65%, at a temperature in the range of from about room temperature up to about 60° C., and heating the composite article at a temperature in the range of from about 325° to 450° C. and preferably 370° to 400° C. for a period of about 0.25 to 15 minutes and preferably 0.5 to 3 minutes. Optionally, the colloidal hexafluoropropylene/tetrafluoroethylene copolymer can have blended therewith up to about 95% on a polymer weight basis of colloidal polyeterafluoroethylene, the solids content of the aqueous dispersion being in the range of about 5% to 65%.

The utility of the laminar structures of the present invention is in general similar to that of other well known polyimide films. For example, tapes of the laminar structure of various widths are useful as insulation when wrapped on electrical wire and cable. The film being heat-sealable, the tape can be sealed in place after wrapping and is especially useful for wire and cable which must resist exposure to high and low temperature stress.

The particular advantage of the laminar structures of this invention over those of the prior art lies in their superior retention of bond strength under conditions of high temperature and high humidity when compared to the heat-sealable polyimides previously available.

The principle and practice of the present invention will now be illustrated by the following examples which are provided to show the practice and use thereof.

The test samples of the laminar structures prepared in the following examples were evaluated in accordance with the following testing procedure:

Heat-Seal strength is measured by cutting a piece of the laminar film test sample of 4 inches by 10 inches, with the grain of the film running in the long or machine direction, into two pieces each of 4 inches by 5 inches. The two test pieces are placed in superposed relation so that opposing fluoropolymer surfaces thereof are in contact. The superimposed films are then sealed together at each end at right angles to the grain of the film by means of a ¾ inch wide sealing bar that is heated to a temperature of 350° C. and contacts the film ends at 20 p.s.i. pressure for 30 seconds. The sealed test samples are then cut in half at right angles to the grain of the film, and the two resulting pieces are each cut along their centerline and parallel to the grain of the film to provide 1 inch wide strips. The resulting four sets of strips are tested for heat-seal strength by securing the free ends thereof in a Suter testing machine and pulling the test samples apart. The highest force in grams required to pull the strips apart is taken as a measure of the heat-seal bond strength.

EXAMPLE 1

A 15% solids polyamide-acid solution was prepared by reacting 370.0 g. (0.833 mole) of 2,2-bis-(3,4-dicarboxyphenyl)hexafluoropropane dianhydride and 166.7 g. (0.833 mole) of bis-(4-aminophenyl)ether in 3040 ml. of N,N-dimethylacetamide (DMAC); the polyamide-acid has an inherent viscosity of 1.24 (measured as a 0.5% by weight solution in DMAC at 30° C.). Two additional duplicate runs gave polyamide-acid with inherent viscosities of 1.55 and 1.46. A fourth run, employing 330.0 g. (0.743 mole) of the same dianhydride and 148.6 g. (0.743 mole) of the same diamine in 2700 ml. of DMAC, gave polyamide-acid with an inherent viscosity of 1.44. The four polyamide-acid solutions were combined and blended together.

A roll of 1-mil film of the polypyromellitimide of bis-(4-aminophenyl)ether was coated on both sides with the above combined polyamide-acid solution. The film was dried and the coating cured to the corresponding polyimide in a two-stage oven heated to 160° C. in the first stage and 265° C. in the second stage; at this point the film contained 0.07% by weight residual DMAC. The film was restrained laterally on a tenter frame and passed through an oven at 380° C., and dried to a residual DMAC content of 0.025% by weight. The total coating thickness was 0.5-mil, or about 0.25-mill on each side.

The above coated film was laminated to the treated side of a 0.5-mil flurocarbon polymer film (copolymer of tetrafluoroethylene and hexafluoropropylene) treated on one side with an electrical discharge in an atmosphere of glycidyl methacrylate in accordance with the procedure described in U.S. 3,296,011. The conditions for lamination were 10 seconds at 250° C. under 5 p.s.i. Samples of this film were heat sealed to itself, fluoropolymer-surface-to-fluoropolymer-surface, at 350° C. under 20 p.s.i. for 30 seconds. Heat seals were tested immediately, and after various period of aging in air at 200° C. The results were compared against two types of control film and are given in Table I below.

One control (A) was prepared from a 1-mil sheet of the polypyromellitimide of bis-(4-aminophenyl)ether and the same treated 0.5-mil fluorocarbon polymer film as described above. The lamination conditions were 10 seconds at 250° C. under 5 p.s.i. Samples of this film were heat sealed to itself, fluoropolymer-surface-to-fluoropolymer-sulface, under the same conditions as above. The results are given in Table I.

A second control (B) was prepared from two films like those used for control A, except that the polyimide film was first primed with a solution of 50 g. of a 50% aqueous polyethylenimine solution in 16 liters of methanol and dried. The lamination conditions were 1 second at 240° to 250° C. under 40 p.s.i. Samples of this film were sealed to itself, fluoropolymer-surface-to-fluoropolymer surface, under the same conditions as above. The results are given in Table I.

TABLE I.—HEAT-SEAL STRENGTHS ON AGING AT 200° C IN AIR

| No. of days | Example 1, g./in. | Control | |
|---|---|---|---|
| | | A, g./in. | B, g./in. |
| 0 | 1,403 | 1,382 | 1,987 |
| 2 | 1,682 | 1,005 | 878 |
| 5 | 1,492 | 1,012 | 522 |
| 12 | 588 | 518 | 200 |
| 20 | 835 | 183 | 0 |
| 30 | 477 | 100 | 0 |
| 44 | 330 | 0 | 0 |
| 61 | 317 | | |

EXAMPLES 2–3

A 1-mil film of the polypyromellitimide of bis-(4-aminophenyl)ether was coated on one side with a 17% solids solution in N,N-dimethylacetamide of the polyamide-acid prepared from equimolar quantities of benzophenone-3,4,3',4'-tetracarboxylic dianhydride (BTDA) and bis-(4-aminophenyl) ether (POP), and the coating was dried and cured to the corresponding polyimide in a two-stage oven, the first stage at 145° C. and the second at 300° C. The dry coating thickness was 0.2 to 0.25 mil.

Samples of the above film were assembled with the coated sides of two sheets facing together, there being between these two sheets two layers of the treated 0.5-mil fluorocarbon polymer film described in Example 1, the two fluoropolymer layers disposed so that the two untreated sides contacted one another and each treated side contacted a BTDA-POP polyimide layer. Such assemblies were heat sealed at 350° C. for 20 seconds under 20 p.s.i. In this example the three layer non-heat-sealable-polyimide/heat-sealable-polyimide/fluoropolymer structure was prepared and heat-sealed to itself in a single operation. The initial heat-seal values and those after aging for periods in air at 200° C. are given for three different samples (A, B and C) in Table II below.

A control was prepared as in the previous paragraph, except than an uncoated 1-mil film of the polypyromellitimide of bis-(4-aminophenyl)ether was used in place of the coated film. The heat-seal values of the control before and after aging are given in Table II below.

Example 2 was repeated with the exception that the coating applied to the polyimide film was a 20% solids solution of the polyamide-acid prepared from equimolar amounts of benzophenone - 3,4,3',4' - tetracarboxylic dianhydride (BTDA) and meta-phenylenediamine (MPD) in N,N-dimethylacetamide. The heat-seal values are given in Table II below under the heading of Example 3.

TABLE II.—HEAT-SEAL STRENGTHS ON AGING AT 200° C. IN AIR

| No. of days | Control g./in. | Example | | | |
|---|---|---|---|---|---|
| | | 2A, g./in. | 2B, g./in. | 2C, g./in. | 3, g./in. |
| 0 | 1,250 | 2,220 | | 1,800 | 1,800 |
| 5 | 750 | 1,240 | | | 1,200 |
| 10 | 100 | 880 | | | 750 |
| 13 | 0 | | | 400 | |
| 15 | | | | | 500 |
| 20 | | | 890 | | |
| 21 | | | | 500 | |
| 25 | | | | | 100 |
| 30 | | | 100 | | |
| 35 | | | | | 160 |
| 40 | | | | 0 | |
| 53 | | | | | 0 |

EXAMPLE 4

A 1-mil film of the polypyromellitimide of bis-(4-aminophenyl)ether was coated on both sides with a 14% solids solution in DMAC of the polyamide-acid of benzophenone - 3,4,3',4'-tetracarboxylic dianhydride and bis-(4-aminophenyl)ether, and the coating was dried and cured in a two-stage oven, the first stage at 145° C. and the second at 300° C. The dry coating thickness was 0.25 mil per side.

The above coated film was laminated to the treated side of a 0.5-mil fluorocarbon polymer film (copolymer of tetrafluoroethylene and hexafluoropropylene) treated on one side with an electrical discharge in an atmosphere of glycidyl methacrylate (as described in U.S. 3,296,011). The conditions for lamination were 10 seconds at 250° C. under 5 p.s.i. The product was a four-layer structure.

The procedure of the preceding paragraph was repeated in order to laminate a like fluorocarbon polymer film to the second side of the above film.

Samples of the resulting five-layer structure were heat sealed at 350° C. under 20 p.s.i. for 10 seconds. Heat seals were tested after various periods of aging in air at 200° C. The results are compared against a control film prepared by the procedure for making control film B of Example 1, except that the control was sealed to itself at 350° C. under 20 p.s.i. for 10 seconds. The results are given in Table III below.

TABLE III.—HEAT-SEAL STRENGTHS ON AGING AT 200° C. IN AIR

| No. of days | Example 4, g./in. | Control, g./in. |
|---|---|---|
| 0 | 2,300 | 1,300 |
| 7 | 1,500 | 950 |
| 15 | 1,400 | 300 |
| 26 | 1,200 | 50 |
| 39 | 1,200 | |
| 52 | 900 | |

EXAMPLE 5

A polyamide-acid priming solution was prepared in accordance with the procedure described in U.S. Pat. No. 3,179,614, by slowly adding 161.1 g. (0.5 mole) of 3,4,3',4'-benzophenonetetracarboxylic dianhydride to a solution of 100.0 g. (0.5 mole) of bis(4-aminophenyl) ether in 1485 ml. of dry N,N-dimethylacetamide (DMAC). The resulting polyamide acid had an inherent viscosity of 0.88, measured on a 0.5% by weight solution in DMAC at 30° C. Additional DMAC was added to the polyamide-acid solution to give a total volume of 16 liters. This priming solution was approximately 1.6% solids (wt./vol. basis).

A 200-foot roll of 1-mil film of the polypyromellitimide of bis-(4-aminophenyl) ether was primed on both sides with the above priming solution, excess bath was wiped from each surface with stationary smoothing rolls, and passed through a first drying oven heated at 150° C. and a second drying oven at 240° C., at a speed of 20 feet per minute. A comparison of the thickness of the primed film and the unprimed base sheet with a Hamilton thickness gauge indicated the two films to have essentially the same thickness; it was therefore concluded that the thickness of the primer coating was of the order of 0.01 mil or less.

One side of the above-primed film was laminated to the treated side of a 0.5-mil fluorocarbon polymer film (copolymer of tetrafluoroethylene and hexafluoropropylene) treated on one side with an electrical discharge in an atmosphere of glycidyl methacrylate; the lamination was carried out by combining the two films in the nip of a drum laminator with a drum temperature 260° C. at 50 feet per minute (side A of lamainate). The remaining exposed primed side of the resulting film was then laminated to the treated side of another electrically discharge treated 0.5-mil fluorocarbon polymer film under the same laminating conditions (side B of laminate). Samples of the resulting film were heat-sealed, side A to side A, at 350° C. under 20 p.s.i. for 30 seconds. The heat seals were tested immediately, and after various periods of aging in air at 200° C. The results were compared against a control film, and are given in Table IV below.

The control film was prepared from a 1-mil sheet of the polypyromellitimide of bis(4-aminophenyl) ether which had been primed on both sides with polyethylenimine, and two sheets of 0.5-mil fluorocarbon polymer film treated on one side with an electrical discharge in an atmosphere of glycidyl methacrylate, with the treated fluoropolymer surfaces against opposite sides of the polyimide film. Lamination conditions were the same as above. Samples were heat-sealed under the same conditions as above.

EXAMPLE 6

A polyamide-acid solution was prepared by slowly adding 185.0 g. (0.42 mole) of 2,2-bis(3,4-dicarboxyphenyl) hexafluoropropane dianhydride to a solution of 83.4 g. (0.417 mole) of bis(4-aminophenyl) ether in 1520 ml. of DMAC. The resulting polyamide-acid had an inherent viscosity of 0.94, measured on a 0.5% by weight solution in DMAC at 30° C. To this solution was added 100 ml. of acetic anhydride and 50 ml. of pyridine, and the mixture was stirred for one hour, in order to convert the polyamide acid to the corresponding soluble polyimide. Additional DMAC was added to the soluble polyimide solution to give a total volume of 16 liters. This priming solution was approximately 1.6% solids (wt./vol. basis).

A 200-foot roll of 1-mil polyimide film was primed on both sides with this priming solution, using the priming procedure and conditions of Example 5. Again, the thickness of primer was estimated to be 0.01 mil or less.

The resulting primed film was laminated to two fluorocarbon polymer films and tested as described in Example 5. The results are also given in Table IV below.

TABLE IV.—HEAT-SEAL STRENGTHS ON AGING AT 200° C. IN AIR

| Number of days | Example 5, g./in. | Example 6, g./l. | Control, g./in. |
|---|---|---|---|
| 0 | 1,540 | 1,500 | 2,233 |
| 3 | 1,253 | 1,263 | 590 |
| 7 | 997 | 1,115 | 428 |
| 11 | 845 | 847 | 132 |
| 21 | 707 | 705 | 0 |
| 31 | 577 | 682 | 0 |
| 41 | 335 | 462 | 0 |
| 52 | 397 | 285 | 0 |
| 80 | 87 | 55 | 0 |
| 101 | 17 | 0 | 0 |

What is claimed is:

1. A laminar structure comprising, and bonded together in the order specified, a layer of a non-heat sealable polyimide characterized by a recurring unit having the structural formula:

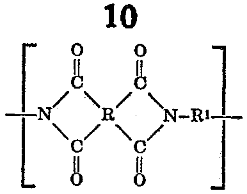

where R is a tretavalent aromatic organic radical including the following and substituted derivatives thereof:

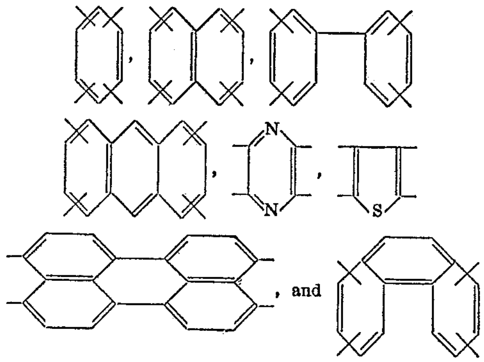

and where $R^1$ is a divalent aromatic radical selected from the following groups: phenylene, naphthylene, biphenylene, anthrylene, furylene, benzfurylene, and

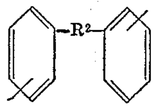

wherein $R^2$ is selected from alkylene of 1–3 carbon atoms, oxygen, sulfur, or one of the following:

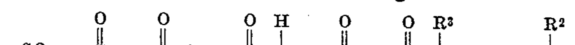

wherein $R^3$ is methyl or phenyl; a layer of heat-sealable polyimide characterized by a recurring unit having the structural formula:

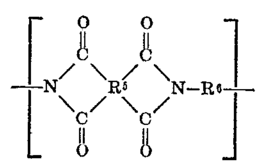

where $R^5$ is

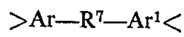

where Ar is phenylene, $Ar^1$ is phenylene, biphenylene or naphthylene, and $R^7$ is —O—, —S—,

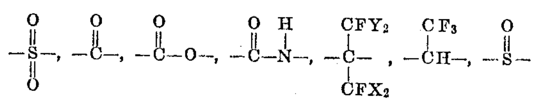

or alkylene of 1 through 3 carbons, where each X is separately chosen from the group consisting of F and Cl; and $R^6$ is alkylene of 7 through 10 carbons, meta-phenylene, or the following:

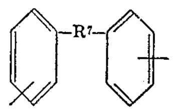

where $R^7$ has the same meaning as above; and a layer of fluorocarbon polymeric material.

2. The laminar structure of claim 1 wherein the layer of non-heat-sealable polyimide is of a thickness between about 0.25 mil and about 5 mils.

3. The laminar structure of claim 2 wherein the thickness of the heat-sealable polyimide layer is up to about 2 mils.

4. The laminar structure of claim 3 wherein said fluorocarbon polymeric material is a copolymer of hexafluoropropylene and tetrafluoroethylene.

5. The laminar structure of claim 4 wherein said copolymer is between about 5% and about 50% by weight, based upon the total copolymer weight, of hexafluoropropylene and between about 50% and about 95% by weight, based upon the total copolymer weights, of tetrafluoroethylene.

6. The laminar structure of claim 5 wherein the layer of said copolymer is between about 0.05 mil and about 1 mil thick.

References Cited

UNITED STATES PATENTS

| | | | |
|---|---|---|---|
| 3,455,774 | 7/1969 | Lindsey et al. | 161—189 |
| 3,567,504 | 3/1971 | Hopkins et al. | 161—189 X |
| 3,575,787 | 4/1971 | Pietrocini et al. | 161—189 X |
| 3,592,714 | 7/1971 | Katz | 161—189 X |
| 3,408,453 | 10/1968 | Shelton | 174—110 X |
| 3,534,003 | 10/1970 | Holub et al. | 161—227 X |
| 3,539,537 | 11/1970 | Holub et al. | 161—227 X |
| 3,541,057 | 11/1970 | Kreuz | 161—227 X |
| 3,422,215 | 1/1969 | Humes | 174—120 |
| 3,427,188 | 2/1969 | Jones | 117—122 |
| 3,505,168 | 4/1970 | Dunphy et al. | 161—227 |

FOREIGN PATENTS

| | | |
|---|---|---|
| 1,039,967 | 8/1966 | Great Britain. |

HAROLD ANSHER, Primary Examiner

U.S. Cl. X.R.

161—189, 227; 174—121 S R